United States Patent
Ishihara et al.

(10) Patent No.: US 9,487,932 B2
(45) Date of Patent: *Nov. 8, 2016

(54) HYBRID CONSTRUCTION MACHINE

(71) Applicant: Hitachi Construction Machinery Co., Ltd., Bunkyo-ku, Tokyo (JP)

(72) Inventors: Shinji Ishihara, Tokyo (JP); Masatoshi Hoshino, Tokyo (JP); Hiroshi Sakamoto, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 14/400,947

(22) PCT Filed: May 10, 2013

(86) PCT No.: PCT/JP2013/063199
§ 371 (c)(1),
(2) Date: Nov. 13, 2014

(87) PCT Pub. No.: WO2013/172276
PCT Pub. Date: Nov. 21, 2013

(65) Prior Publication Data
US 2015/0144408 A1 May 28, 2015

(30) Foreign Application Priority Data
May 14, 2012 (JP) ................................ 2012-110875

(51) Int. Cl.
*B60W 10/08* (2006.01)
*E02F 9/22* (2006.01)
(Continued)

(52) U.S. Cl.
CPC .............. *E02F 9/2246* (2013.01); *B60L 1/003* (2013.01); *B60L 11/14* (2013.01); *B60L 11/1862* (2013.01);
(Continued)

(58) Field of Classification Search
CPC ............. Y02T 10/7005; Y02T 10/705; Y02T 10/7077; B60W 10/08; H02H 7/0833
See application file for complete search history.

(56) References Cited

U.S. PATENT DOCUMENTS 9,065,361 B2 * 6/2015 Ishihara ................ B60W 10/06
2002/0125052 A1 9/2002 Naruse et al.
(Continued)

FOREIGN PATENT DOCUMENTS

JP 2003-9308 A 1/2003
JP 4512283 B2 7/2010
(Continued)

OTHER PUBLICATIONS

International Search Report (PCT/ISA/210) dated Jun. 11, 2013 with English translation (three pages).
(Continued)

Primary Examiner — Faye M Fleming
(74) Attorney, Agent, or Firm — Crowell & Moring LLP

(57) ABSTRACT

A hybrid construction machine comprises: a motor generator (2) which exchanges torque with an engine (1); a hydraulic pump (3) which is driven by at least one of the engine and the motor generator; a hydraulic actuator (5) which is driven by hydraulic fluid delivered from the hydraulic pump; an electrical storage device (10) for supplying electric power to the motor generator; and a controller (8) which sets target power of the engine and target power of the motor generator so as to satisfy demanded power of the hydraulic pump. The controller makes the setting so that the target power of the engine monotonically increases with the decrease in the remaining electric amount of the electrical storage device. With this configuration, the operator's operational feel can be kept excellent while also achieving reduction in fuel consumption and gas emission.

6 Claims, 13 Drawing Sheets

(51) Int. Cl.
*B60L 11/14* (2006.01)
*B60L 1/00* (2006.01)
*B60L 11/18* (2006.01)
*E02F 9/20* (2006.01)
*F02D 29/04* (2006.01)
*B60W 20/00* (2016.01)
*H02H 7/08* (2006.01)

(52) U.S. Cl.
CPC .............. *B60W 10/08* (2013.01); *B60W 20/00* (2013.01); *E02F 9/2075* (2013.01); *E02F 9/2296* (2013.01); *F02D 29/04* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2270/12* (2013.01); *H02H 7/0833* (2013.01); *Y02T 10/642* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y10S 903/93* (2013.01)

(56) References Cited

U.S. PATENT DOCUMENTS

2013/0190960 A1* 7/2013 Kawashima .......... B60W 10/06
 701/22
2013/0193892 A1* 8/2013 Ishihara ................ B60W 10/06
 318/454

FOREIGN PATENT DOCUMENTS

| JP | 4633813 B2 | 2/2011 |
| JP | 2011-190072 A | 9/2011 |
| JP | 2012-17677 A | 1/2012 |
| WO | WO 2012/050135 A1 | 4/2012 |

OTHER PUBLICATIONS

International Preliminary Report on Patentability dated Nov. 27, 2014 (seven pages).

* cited by examiner

FIG. 4
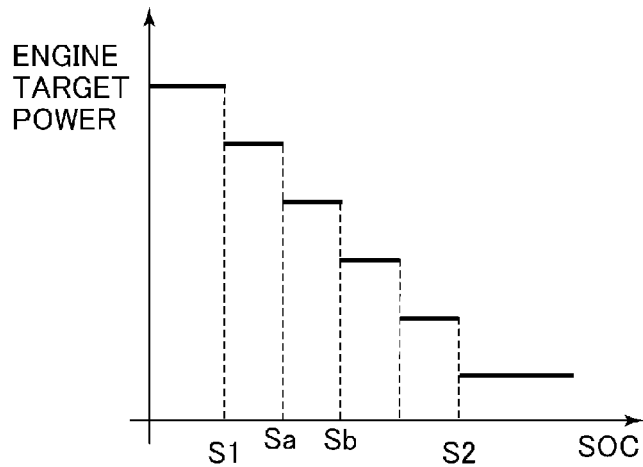
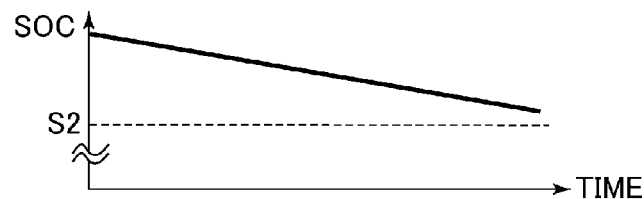
FIG. 5A
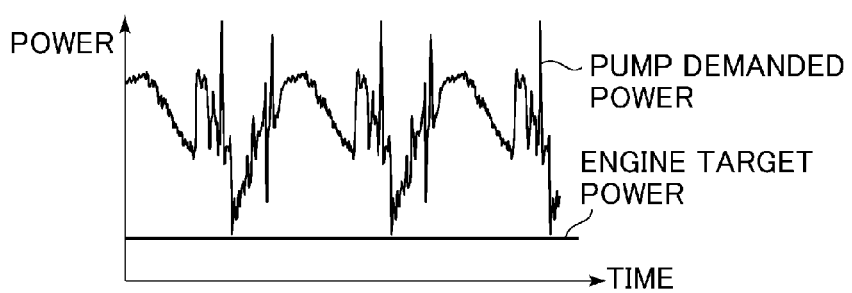
FIG. 5B
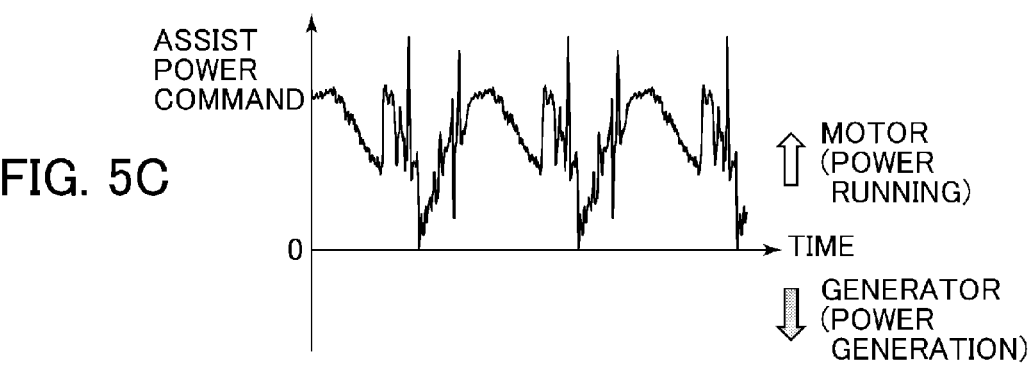
FIG. 5C

HYBRID CONSTRUCTION MACHINE

TECHNICAL FIELD

The present invention relates to a hybrid construction machine (hydraulic excavator, wheel loader, etc.) equipped with an engine and a motor generator as sources of power.

BACKGROUND ART

There are construction machines (hydraulic excavators, wheel loaders, etc.) designed with the purposes of energy saving (low fuel consumption) and reduction in the amount of emission of exhaust gas that is discharged from the engine and leads to increase in the environmental load (carbon dioxide, nitrogen oxides, particulate matter, etc.). Such construction machines include the so-called "hybrid construction machines" which are equipped with not only the engine but also a motor generator as a source of the power.

As a technology for the hybrid construction machines, Japanese Patent No. 4633813 has disclosed a technology for avoiding the drop in the engine combustion efficiency and preventing the generation of black smoke (exhaust gas). This technology attempts to prevent the engine from sharply increasing the power by gradually increasing an upper limit value of the engine output according to a certain rate of increase, thereby reducing the amount of the exhaust gas.

A technology disclosed in Japanese Patent No. 4512283 is configured to adjust excess and deficiency of the power supplied by the engine with respect to the demanded power of the hydraulic pump through the charging/discharging operation of the motor generator. Thus this technology attempts to improve the fuel efficiency through the prevention of oversupply of the total power of the engine and the motor generator and also to prevent the engine stall attributable to undersupply of the power to the hydraulic pump.

In a technology disclosed in JP-2003-9308-A, it is possible for the operator to select a scheme of completely stopping the engine and having the construction machine driven by the motor generator alone. While such scheme is selected, the operation can be performed without consuming the fuel or discharging the exhaust gas.

PRIOR ART LITERATURE

Patent Literature

Patent Literature 1: Japanese Patent No. 4633813
Patent Literature 2: Japanese Patent No. 4512283
Patent Literature 3: JP-2003-9308-A

SUMMARY OF THE INVENTION

Problem to be Solved by the Invention

In the technology disclosed in Japanese Patent No. 4633813, the rate of change of the engine power is limited by gradually increasing the upper limit value of the engine output according to a prescribed rate of increase. However, when the demanded power of the pump exceeds the upper limit of the engine output, the difference between the pump demanded power and the upper limit of the engine output is covered by the power of the motor generator. Thus, when the remaining electric amount of the electrical storage device (e.g., battery) is low and sufficient power assistance from the motor is impossible in the middle of an operation in which the necessary power increases sharply (e.g., excavating operation by an excavator), the power that can be supplied to the pump becomes insufficient and the excavating action is necessitated to slow down. Further, in this situation, the engine might stall when the power that can be supplied from the engine and the motor generator to the pump is significantly lower than the necessary pump power.

In the construction machine described in Japanese Patent No. 4512283, if the engine is operated around its rated power, the charging from the generator to the electrical storage device can be performed constantly by using the surplus power of the engine. Therefore, the deficiency in the remaining electric amount can be prevented and the power assistance by the motor generator can be carried out reliably even when the engine power is lower than the pump demanded power. Accordingly, the slowing down of the excavating action occurring in the aforementioned technology of Japanese Patent No. 4633813 can be avoided. However, in this technology having no limitation on the engine output, transient deterioration in the combustion status is inevitable. Further, if the engine is constantly operated at its rated power point (i.e., a state in which the rate of increase of the engine power is "±0"), the charging and discharging of the electrical storage device are constantly necessary even though the occurrence of the aforementioned transient situations can be avoided. This constantly causes energy loss that is dependent on the efficiency of various electric devices (motor generator, electric transformer (e.g., inverter), electrical storage device, etc.), reducing the effect of the energy saving. Furthermore, continuously operating the engine at its rated power even when the hydraulic pump does not require power cannot be considered to be desirable from the viewpoint of reducing the gas emission.

In the technology of JP-2003-9308-A, it is possible to achieve both of the low fuel consumption and the low gas emission by performing the operation with the engine stopped. However, in order to secure satisfactory operability in the "zero gas emission operation", a motor generator having high power equivalent to the maximum power of the engine becomes necessary. Enlargement of the construction machine is inevitable since the power and the capacity of the motor generator have a positive correlation. With the enlargement of the construction machine, the fuel efficiency deteriorates due to the increase in the energy necessary for the swinging operation of the upper swing structure. Further, the increase in the weight due to the enlargement is undesirable since the climbing ability of the construction machine is deteriorated significantly. Furthermore, in this technology, the change in the power required of the engine can become excessive between the stopped state and the used state of the engine and black smoke can be caused by abrupt fuel injection.

The object of the present invention, which has been made in consideration of the above-described situation, is to provide a hybrid construction machine capable of keeping the operator's operational feel (operational feel to the operator) excellent while also achieving the reduction in the fuel consumption and the gas emission.

Means for Solving the Problem

To achieve the above object, the present invention provides a hybrid construction machine comprising: an engine; a motor generator which exchanges torque with the engine; a hydraulic pump which is driven by at least one of the engine and the motor generator; a hydraulic actuator which is driven by hydraulic fluid delivered from the hydraulic pump; an electrical storage device which supplies electric power to the motor generator; and control means which sets target power of the engine and target power of the motor generator so as to satisfy demanded power of the hydraulic pump. The control means monotonically increases a limit value of the target power of the engine with the decrease in the remaining electric amount of the electrical storage device.

Effect of the Invention

According to the present invention, when the remaining electric amount is relatively high, the pump demanded power is preferentially outputted by the motor generator having high responsiveness. When the remaining electric amount is relatively low, the pump demanded power is preferentially outputted by the engine operating independently of the remaining electric amount. Consequently, excellent operational feel can be secured irrespective of the remaining electric amount, while also achieving the reduction in the fuel consumption and the gas emission.

BRIEF DESCRIPTION OF THE DRAWINGS

FIG. 4 is a schematic diagram showing a power calculation table according to the first embodiment of the present invention.

FIG. 5A-5C are schematic diagrams showing changes in SOC, pump demanded power, engine target power and assist target power when the SOC is high.

MODE FOR CARRYING OUT THE INVENTION

Figure 1:
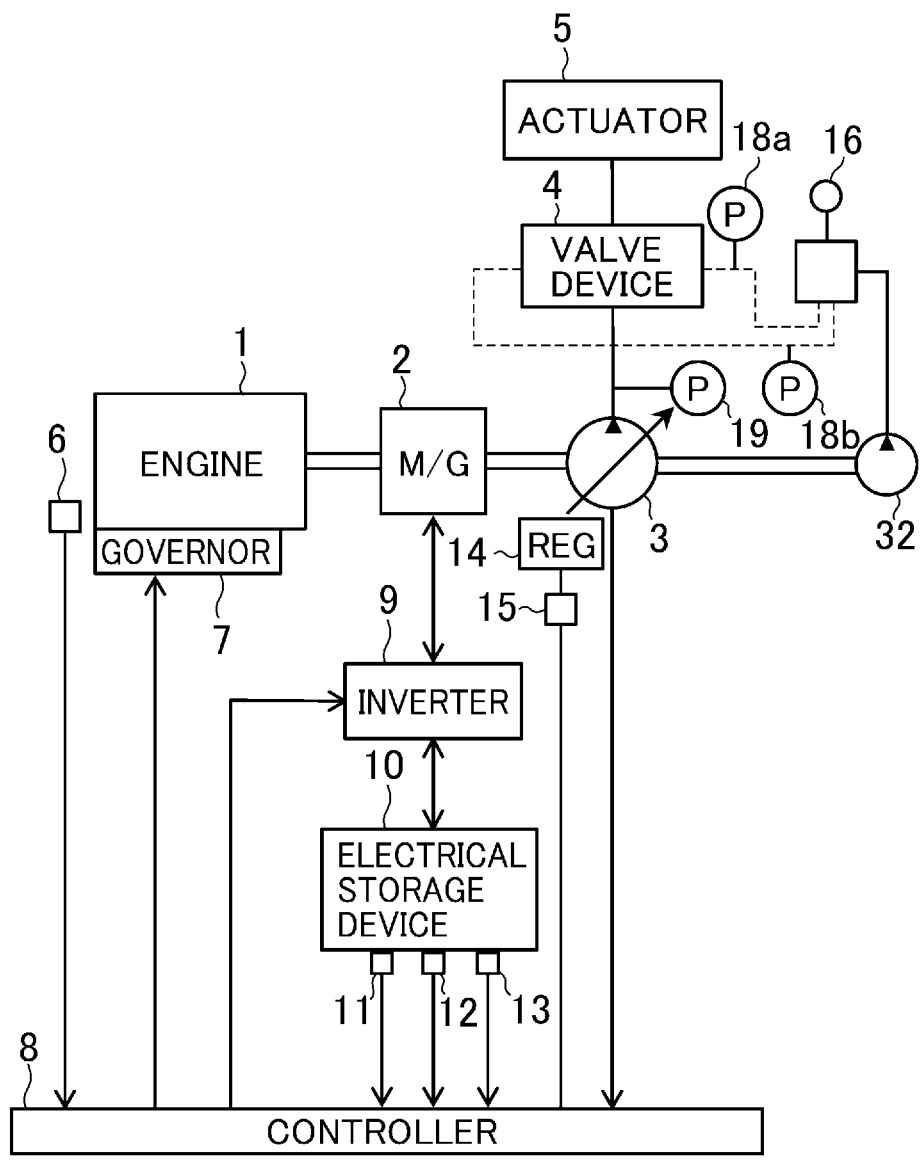
FIG. 1 is a schematic block diagram showing the overall configuration of a hydraulic drive control system of a hybrid hydraulic excavator in accordance with an embodiment of the present invention.

Referring now to the drawings, a description will be given in detail of preferred embodiments of the present invention.

FIG. 1 is a schematic block diagram showing the overall configuration of a hydraulic drive control system of a hybrid hydraulic excavator in accordance with an embodiment of the present invention. The hydraulic drive control system shown in FIG. 1 comprises: an engine 1; a governor 7 which adjusts the fuel injection quantity of the engine 1; a revolution speed sensor (actual revolution speed detection means) 6 which detects the actual revolution speed of the engine 1; a motor generator 2 which is mechanically connected to the output shaft of the engine 1 and exchanges torque with the engine 1; a variable displacement hydraulic pump 3 (hereinafter referred to simply as a "hydraulic pump 3" as needed) and a pilot pump 32 which are mechanically connected to the output shaft of the engine 1 and the motor generator 2 and driven by at least one of the engine 1 and the motor generator 2; hydraulic actuators 5 which are driven by hydraulic fluid delivered from the hydraulic pump 3; control levers (operating devices) 16 for controlling the hydraulic actuators 5 by reducing the pressure of hydraulic fluid delivered from the pilot pump 32 and outputting the decompressed hydraulic fluid to a valve device 4; an electrical storage device (electrical storage means) 10 for storing electric power to be used mainly for driving the motor generator 2; a pump displacement adjustment device (pump displacement adjustment means) 14 which adjusts the displacement of the hydraulic pump 3; a solenoid proportional valve 15 which controls the pump displacement adjustment device 14; an inverter (power conversion device) 9 which controls the motor generator 2 while also controlling the transfer of the electric power between the motor generator 2 and the electrical storage device 10; and a controller (control means) 8 for controlling various devices such as the engine 1, the motor generator 2 and the hydraulic pump 3.

The hydraulic drive control system shown in FIG. 1 controls the driving of each hydraulic actuator 5 by first supplying the hydraulic fluid delivered by the hydraulic pump 3 to the valve device 4 (including a plurality of control valves) and then supplying the hydraulic fluid to each hydraulic actuator 5 after having the valve device 4 properly change the flow rate, direction and/or pressure of the hydraulic fluid. Each control valve in the valve device 4 is controlled by hydraulic fluid which has been delivered from the pilot pump 32 and decompressed according to the operation amount of a corresponding control lever 16. The operation amount of each control lever 16 can be measured by detecting the pressure of the hydraulic fluid outputted from the pilot pump 32 to the valve device 4 (control valve) by use of pressure detection means such as pressure sensors 18$a$ and 18$b$ (see FIG. 1).

The hydraulic actuators 5 installed in the hydraulic excavator of this embodiment include hydraulic cylinders (boom cylinder, arm cylinder, bucket cylinder, etc.) for driving a multijoint work implement which is attached to the front of an upper swing structure of the hydraulic excavator, a hydraulic motor (swing motor) for swinging (rotating) the upper swing structure, hydraulic motors (travel motors) for the traveling of a lower track structure arranged under the upper swing structure, and so forth. These hydraulic actuators are collectively expressed as "HYDRAULIC ACTUATOR 5" in FIG. 1.

The speed control of the engine 1 is carried out through the control of the fuel injection quantity by the governor 7. The hydraulic pump 3 is equipped with means for detecting information necessary for calculating the load on the hydraulic pump 3 (pump information detection means). The pump information detection means includes a pressure sensor 19 (pressure detection means) for measuring the pressure of the hydraulic fluid delivered from the hydraulic pump 3, an unshown flow rate sensor (flow rate detection means) for measuring the flow rate of the hydraulic fluid, and an unshown angle sensor (angle detection means) for measuring the tilting angle of the hydraulic pump 3. The pressure sensor 19, the flow rate sensor and the angle sensor output the detected values (sensor values) to the controller 8.

A regulator 14 and the solenoid proportional valve 15 constitute the pump displacement adjustment device for adjusting the displacement of the hydraulic pump 3 according to an operation signal outputted from the controller 8. The regulator 14 is provided for the hydraulic pump 3. When the tilting angle of the swash plate/shaft of the hydraulic pump 3 is manipulated by the regulator 14, the displacement (displacement volume) of the hydraulic pump 3 is changed, by which the absorption torque (input torque) of the hydraulic pump 3 can be controlled (pump absorption torque control). The solenoid proportional valve 15 is supplied with the hydraulic fluid via a pipe (unshown) connected to the pilot pump 32. The regulator 14 in this embodiment is controlled by control pressure generated by the solenoid proportional valve 15. The solenoid proportional valve 15 operates according to a command value outputted from the controller 8.

Figure 2:
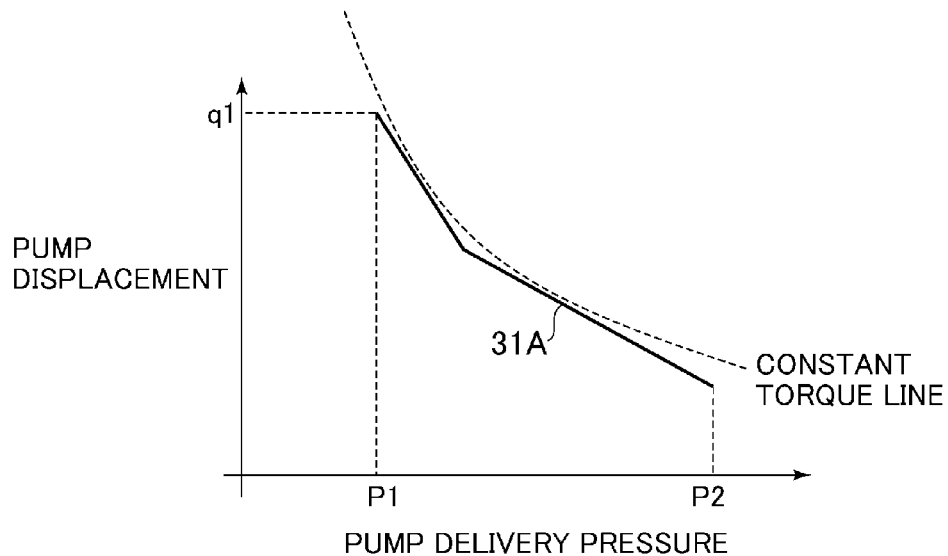
FIG. 2 is a graph showing the control characteristic of pump absorption torque control by a regulator 14 according to an embodiment of the present invention.

The regulator 14 in this embodiment controls the displacement of the hydraulic pump 3 according to a control characteristic diagram shown in FIG. 2, for example. FIG. 2 is a graph showing the control characteristic of the pump absorption torque control by the regulator 14 according to an embodiment of the present invention. The polygonal line 31A in FIG. 2 indicates the characteristic of the displacement of the hydraulic pump 3 which is set corresponding to the delivery pressure of the hydraulic pump 3. The characteristic has been set so that the torque of the hydraulic pump 3 (product of the pump displacement and the pump delivery pressure) remains substantially constant within the maximum value of the total output of the engine 1 and the motor generator 2 (hyperbolic curve (constant torque line) indicated by the broken line in FIG. 2). Thus, the torque of the hydraulic pump 3 can be controlled so as not to exceed the maximum output of the engine 1 and the motor generator 2, by setting the displacement of the hydraulic pump 3 by using the polygonal line 31A according to the pump delivery pressure at each time. When the pump delivery pressure is P1 or less, the pump absorption torque control is not performed and the pump displacement is determined by the operation amounts of the control levers for operating the control valves of the valve device 4 (reaches q1 when the operation amount of any control lever is at the maximum, for example). In contrast, when the pump delivery pressure enters the range between P1 and P2, the pump absorption torque control by the regulator 14 is carried out. In this case, the pump tilting angle is controlled by the regulator 14 so that the pump displacement decreases along the polygonal line 31A with the increase in the pump delivery pressure, by which the pump absorption torque is controlled to remain within the torque specified by the polygonal line 31A. Incidentally, P2 is the maximum value of the pump delivery pressure, which is equal to preset pressure of a relief valve connected to a circuit in a part of the valve device 4 on the hydraulic pump 3's side. The pump delivery pressure does not increase over this value. While the polygonal line 31A made up of a combination of two straight lines is used in this example as the control characteristic diagram of the hydraulic pump absorption torque control, other control characteristic diagrams may also be used as long as the diagram is set within the constant torque line (hyperbolic curve) shown in FIG. 2.

The controller 8 outputs the operation signal (electric signal), generated based on the absorption torque of the hydraulic pump 3, to the solenoid proportional valve 15. The solenoid proportional valve 15 drives the regulator 14 by generating control pressure corresponding to the operation signal. Accordingly, the displacement of the hydraulic pump 3 is changed by the regulator 14, and the absorption torque of the hydraulic pump 3 is adjusted within a range not causing the engine stall.

The electrical storage device 10 (implemented by a battery or a capacitor, for example) is equipped with a current sensor 11, a voltage sensor 12 and a temperature sensor 13 as means for detecting information necessary for calculating the remaining electric amount of the electrical storage device 10 (electrical storage information detection means). The controller 8 manages the remaining electric amount of the electrical storage device 10 by having a remaining electric amount calculation unit 21 (explained later) calculate the remaining electric amount of the electrical storage device 10 based on the necessary information such as the current, voltage and temperature detected by the sensors 11, 12 and 13.

Figure 3:
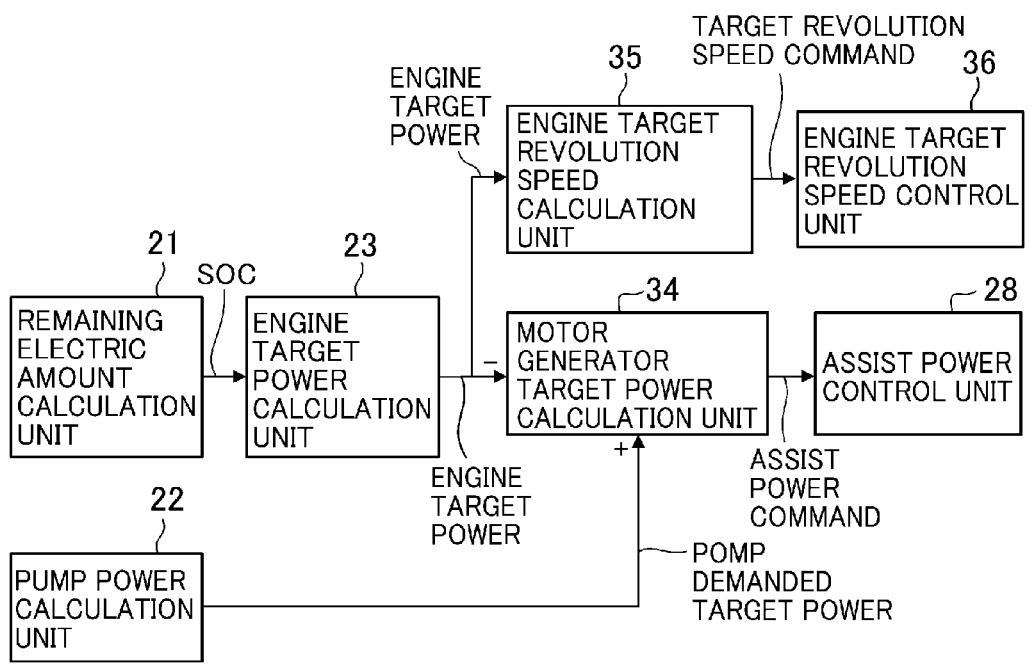
FIG. 3 is a schematic block diagram showing the overall configuration of a controller 8 according to a first embodiment of the present invention.

FIG. 3 is a schematic block diagram showing the overall configuration of the controller 8 according to a first embodiment of the present invention. Components in FIG. 3 identical with those in previous figures are assigned the already-used reference characters and repeated explanation thereof is omitted properly (ditto for subsequent figures). The controller 8 shown in FIG. 3 is a part mainly for executing a process of setting target power of the engine 1 and target power of the motor generator 2 so as to satisfy demanded power of the hydraulic pump 3. The controller 8 includes a remaining electric amount calculation unit 21, an engine target power calculation unit 23, a pump power calculation unit 22, a motor generator target power calculation unit 34, an assist power control unit 28, an engine target revolution speed calculation unit 35, and an engine target revolution speed control unit 36. The controller 8 includes an arithmetic processing unit for executing various processing programs according to the present invention (e.g., CPU), a data storage unit for storing various data such as the control programs (e.g., ROM and RAM), etc. (unshown) as its hardware configuration. The controller 8 also controls the hydraulic system and various electrical components (detailed explanation is omitted here).

The remaining electric amount calculation unit (remaining electric amount calculation means) 21 is a part for executing a process of calculating the remaining electric amount (SOC (State Of Charge), hereinafter referred to as SOC as needed) of the electrical storage device 10 and outputting the calculated remaining electric amount. The remaining electric amount can be calculated by using a publicly known method. For example, the remaining electric amount can be calculated based on the information (current, voltage, temperature, etc.) detected by the current sensor 11, the voltage sensor 12 and the temperature sensor 13.

The engine target power calculation unit (engine target power calculation means) 23 is a part for executing a process of calculating the target power of the engine 1 (engine target power) based on the SOC outputted from the remaining electric amount calculation unit 21. The characteristic of the engine target power has been set by the engine target power calculation unit 23 so that the engine target power monotonically increases with the decrease in the SOC. The "monotonically increasing" in this explanation includes not only (1) "monotonically increasing in a narrow sense" (the engine target power constantly increases with the decrease in the SOC) but also (2) "monotonically increasing in a broad sense" (the engine target power increases step-wise (discretely) with the decrease in the SOC while being kept constant in a prescribed SOC range. Incidentally, the "monotonically increasing in a broad sense" is also called "monotonically non-decreasing" since the engine target power increases without decreasing with the decrease in the SOC. The engine target power calculation unit 23 in this embodiment uses a power calculation table shown in FIG. 4 for the calculation of the engine target power based on the SOC.

FIG. 4 is a schematic diagram showing the power calculation table according to the first embodiment of the present invention. This table has a horizontal axis representing the SOC as the input from the remaining electric amount calculation unit 21 and a vertical axis representing the target power as the output of the engine target power calculation unit 23. As shown in FIG. 4, the power calculation table according to this embodiment has been set so that the engine target power increases step-wise with the decrease in the SOC (monotonically increasing in a broad sense). As seen in the whole table, the engine target power increases to the left and there is no part decreasing to the left. According to the power calculation table, when the remaining electric amount is relatively high (the SOC is relatively high), the engine target power is set low, aiming to reduce the fuel consumption by lowering the target power of the engine 1. In contrast, when the remaining electric amount is relatively low (the SOC is relatively low), the engine target power is set high. In short, when the SOC is low, the overdischarge of the electrical storage device 10 is avoided by increasing the frequency of using the motor generator 2 as a generator.

In the example of FIG. 4, the engine target power is set at the maximum power of the engine 1 when the SOC falls to or below S1 (first set value). When the SOC rises to or above S2 (second set value (S2>S1)), the engine target power is set at a value lower than the minimum power of the hydraulic pump 3. Thus, the motor generator 2 operates as a motor when the SOC is S2 or higher.

In this example, a table in which the engine target power monotonically increases step-wise with the decrease in the SOC (monotonically increasing in a broad sense) is used from the viewpoint of preventing the engine target power from easily changing in response to the change in the SOC. Such setting of the table is also advantageous in that the used capacity in the data storage unit can be reduced and an increase in the calculation speed of the arithmetic processing unit can be expected. The method of designing the table is not restricted to this example. For example, a table in which the engine target power constantly increases with the decrease in the SOC (monotonically increasing in a narrow sense) may also be used (e.g., curved graph) as will be explained later.

The pump power calculation unit (pump power calculation means) 22 is a part for executing a process of calculating the demanded power of the hydraulic pump 3 (pump demanded power) and outputting the calculated pump demanded power. The demanded power of the hydraulic pump 3 can be calculated based on the magnitude of the operation amounts of the control levers 16 (lever operation amounts) inputted thereto, for example. The operation amount of a control lever 16 can be detected by using the measurements by the pressure sensors 18*a* and 18*b*, for example. It is also possible to regard the actual pump power outputted by the hydraulic pump 3 as the pump demanded power instead of calculating the pump demanded power. The actual pump power can be calculated by multiplying the pump delivery pressure (detected through the pressure sensor 19) and the pump delivery flow rate (detected through the flow rate sensor), for example.

The motor generator target power calculation unit (motor generator target power calculation means) 34 is a part for executing a process of calculating the target power of the motor generator 2 (assist target power) based on the engine target power and the pump demanded power. In this embodiment, the assist target power is calculated by subtracting the engine target power outputted by the engine target power calculation unit 23 from the pump demanded power outputted by the pump power calculation unit 22 (assist target power=pump demanded power−engine target power). The assist target power calculated as above is converted into an assist power command and outputted to the assist power control unit 28. When the assist target power is a positive value (i.e., pump demanded power>engine target power), the motor generator 2 operates as a motor by using the electric power from the electrical storage device 10. When the assist target power is a negative value (i.e., pump demanded power<engine target power), the motor generator 2 operates as a generator by being driven by the engine 1.

The assist power control unit (assist power control means) 28 is a part for controlling the motor generator 2 according to the assist power command. The assist power control unit 28 corresponds to the inverter 9 shown in FIG. 1.

The engine target revolution speed calculation unit (target revolution speed calculation means) 35 is a part for executing a process of calculating the target revolution speed of the engine 1 based on the engine target power outputted from the engine target power calculation unit 23. The target revolution speed can be calculated by, for example, selecting a combination of revolution speed and torque achieving desired fuel efficiency from a plurality of combinations of revolution speed and torque that can achieve the engine target power inputted from the engine target power calculation unit 23 and then determining the revolution speed in the selected combination as the target revolution speed. The engine target revolution speed calculated as above is converted into a target revolution speed command and outputted to the engine target revolution speed control unit 36.

The engine target revolution speed control unit (engine control means) 36 is a part for controlling the engine 1 according to the target revolution speed command. The engine target revolution speed control unit 36 corresponds to the governor 7 shown in FIG. 1.

Next, how the pump demanded power, the engine target power and the assist target power are calculated according to the SOC in the hydraulic excavator configured as above will be explained below along a time line.

FIG. 5 is a schematic diagram showing changes in the SOC, the pump demanded power, the engine target power and the aforementioned assist power command (converted from the assist target power by the motor generator target power calculation unit 34) when the SOC is not less than S2 and sufficiently high (e.g., at the start of a day's operation after nighttime charging of the electrical storage device 10). When the SOC is not less than S2 as shown in FIG. 5, the engine target power starts from a minimum value. In the example of FIG. 5, the SOC is not less than S2 and the minimum value of the engine target power is set below or at the minimum power of the hydraulic pump 3. In this case, the motor generator 2 never operates as a generator; the motor generator 2 operates as a motor or stops its operation.

Along with the discharge of electricity from the electrical storage device 10, the SOC decreases gradually as shown in FIG. 5(a). However, the engine target power is kept at a constant level (minimum value) since the SOC does not fall below S2 in the period shown in FIG. 5(a). As above, when the SOC is high, the engine target power is set relatively low, and thus the difference between the pump demanded power and the engine target power takes on positive values. Thus, the assist power command to the motor generator 2 (assist target power) shown in FIG. 5(c) works on the assisting side. Accordingly, the motor generator 2 can easily follow the change in the pump demanded power even if the actual power of the engine 1 is kept substantially constant. Especially, the operator's operational feel can be kept excellent since the motor generator 2 excels the engine 1 in the responsiveness. Further, fuel consumption and gas emission can be reduced since the fuel consumption by the engine 1 can be reduced.

Figure 6A:
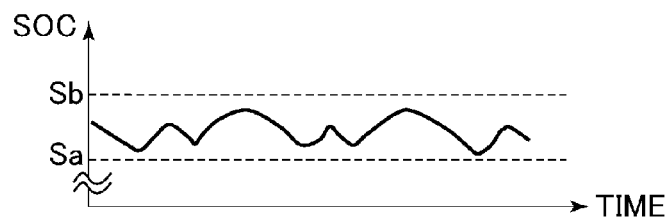
FIG. 6A-6C are schematic diagrams showing changes in the SOC, the pump demanded power, the engine target power and the assist target power when the SOC has decreased to a prescribed level.
Figure 6B:
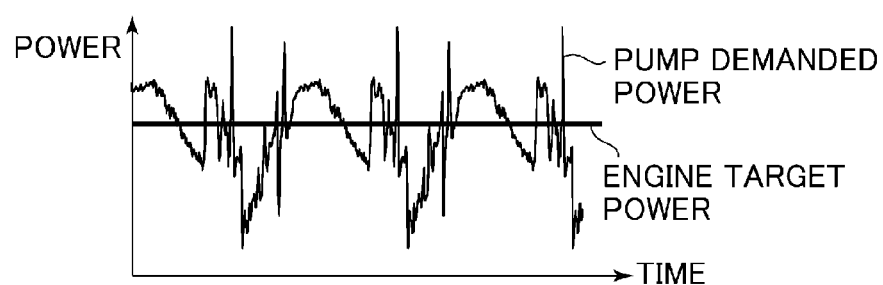

Next, the behavior of the above-described values when the operation shown in FIG. 5 has continued for a certain period and the SOC has decreased to a value higher than S1 and lower than S2 will be explained below referring to FIG. 6. FIG. 6 is a schematic diagram showing changes in the SOC, the pump demanded power, the engine target power and the assist target power (i.e., the assist power command) when the SOC is higher than S1 and lower than S2 (more specifically, higher than Sa and lower than Sb in FIG. 4).

Figure 6C:
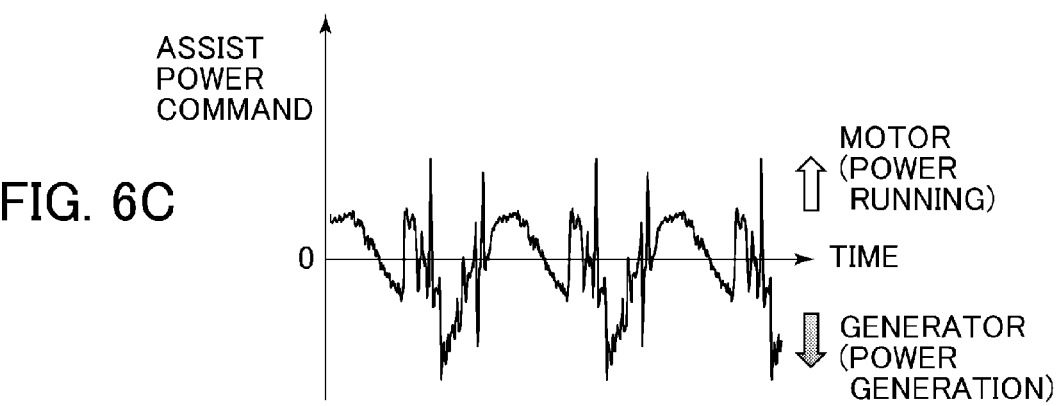

In this case, in response to the decrease in the SOC, the engine target power calculated by the engine target power calculation unit 23 has become higher than that in FIG. 5. Thus, while the engine target power is kept at a constant value, the assist power command to the motor generator 2 (calculated as "pump demanded power−engine target power") repeats charging and discharging as shown in FIG. 6(c).

In cases where the SOC value changes as above, it is desirable to previously adjust the engine target power substantially at the median (e.g., moving average) of the pump demanded power or at a value slightly higher than the median. The adjustment of the engine target power may be made by predicting the pump demanded power from the operation amounts of the control levers 16 and successively rewriting the calculation table, for example. In cases where operations to be performed by the hydraulic excavator are previously known, the adjustment of the engine target power may be made to suit the operations. Thanks to the adjustment, when the SOC has become low, the engine target power takes on the median of the pump demanded power, and thus the assist power command to the motor generator 2 repeats charging and discharging as shown in FIG. 6(c). This keeps the SOC at a constant level while also preventing sharp changes in the power of the engine 1. Consequently, the situations where the assistance by the motor generator 2 is impossible can be avoided. On the other hand, setting the engine target power higher than the median of the pump demanded power has the effect of increasing the frequency of the commands on the charging side and preventing the decrease in the SOC caused by the energy loss due to the charging and discharging.

Figure 7A:
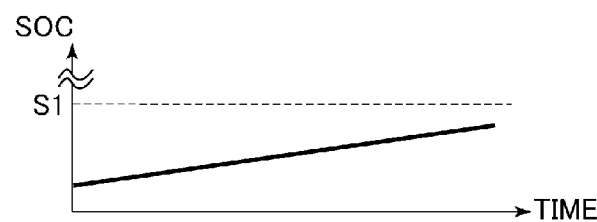
FIG. 7A-7C are schematic diagrams showing changes in the SOC, the pump demanded power, the engine target power and the assist target power when the SOC is low.
Figure 7B:
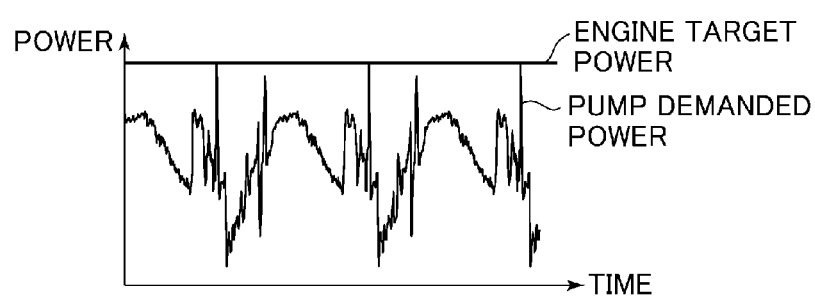
Figure 7C:
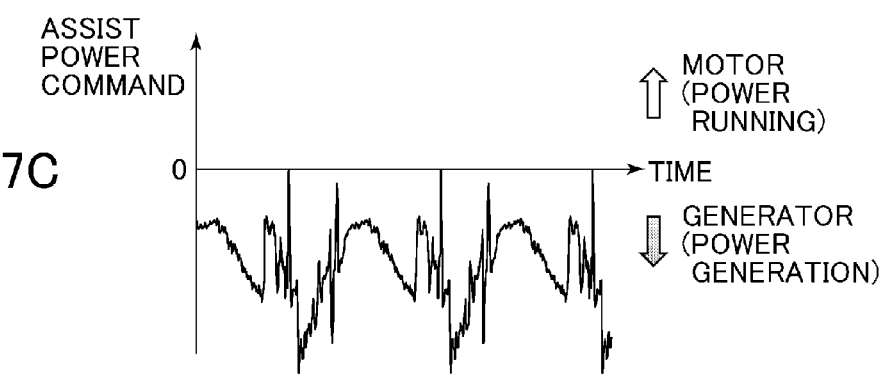

Finally, the behavior of the above-described values when the SOC has fallen below S1 will be explained referring to FIG. 7. FIG. 7 is a schematic diagram showing changes in the SOC, the pump demanded power, the engine target power and the assist target power (i.e., the assist power command) when the SOC is lower than S1.

In this case, the engine target power calculated by the engine target power calculation unit 23 is set at the maximum value of the engine power. Thus, the motor generator 2 never operates as a motor; the motor generator 2 operates as a generator or stops its operation. Accordingly, the SOC tends to increase with the passage of time as shown in FIG. 7(a).

With the above setting of the engine target power, when the SOC is low, the pump demanded power is preferentially outputted by the engine 1 operating independently of the magnitude of the SOC. Thus, the operator's operational feel can be kept excellent. Further, since the engine 1 is operated at its rated power point (maximum power) in this case, the combustion status of the engine 1 is stabilized and the content of environmental load substances in the exhaust gas is reduced. Furthermore, improvement in the fuel efficiency can be expected since the power generation is performed at a high output power point (where the efficiency of the engine 1 is high) when the pump demanded power is low. Moreover, by using the engine 1 capable of outputting power higher than the maximum value of the pump demanded power, no power deficiency occurs with respect to the pump demanded power, and thus the operator's operational feel can constantly be kept excellent.

Incidentally, the set value S1 of the SOC (see FIG. 4) is desired to be designed based on the variation profile of the pump demanded power in the construction machine employing the present invention. When the present invention is employed for a hydraulic excavator, for example, there are cases where the pump demanded power momentarily increases (mainly in the excavating operations). It is desirable to set S1 so that a certain level of electric power, sufficient for generating assist power capable of suppressing sudden changes in the engine power, can be secured even in such cases. The set value S1 is desired to be designed while estimating a certain safety margin with respect to this minimum power. By designing S1 as above, sudden changes in the engine power can be prevented, while also avoiding the overdischarge thanks to the estimation of the safety margin.

According to this embodiment configured as above, when the SOC is relatively high, the pump demanded power is mainly covered by the power of the motor generator 2 (assist power). Thus, transient fuel injection into the engine 1 is reduced and the content of the environmental load substances in the exhaust gas is reduced. Further, thanks to the configuration in which the share of the burden on the engine 1 is increased with the decrease in the SOC, the pump demanded power can be secured by the engine 1 even when sufficient assist power cannot be outputted due to low SOC. It is confirmed that the demanded power of the hydraulic pump 3 is successfully secured by the sum of the power of the engine 1 and the power of the motor generator 2 in all the states shown in FIGS. 5-7. Therefore, according to this embodiment, the hydraulic actuators 5 can be operated at speeds equivalent to those in conventional construction machines irrespective of the remaining electric amount of the electrical storage device 10, that is, the operator's operational feel can be kept excellent.

Furthermore, by employing the control configuration described above, the charging and the discharging by the motor generator 2 can easily be kept in balance since the demanded power of the hydraulic pump 3 periodically repeats similar waveforms in repetitive operations in which a certain operation is repeated (e.g., excavating operation of a hybrid excavator). Consequently, the SOC remains within a certain range and stable operation becomes possible.

Figure 8:
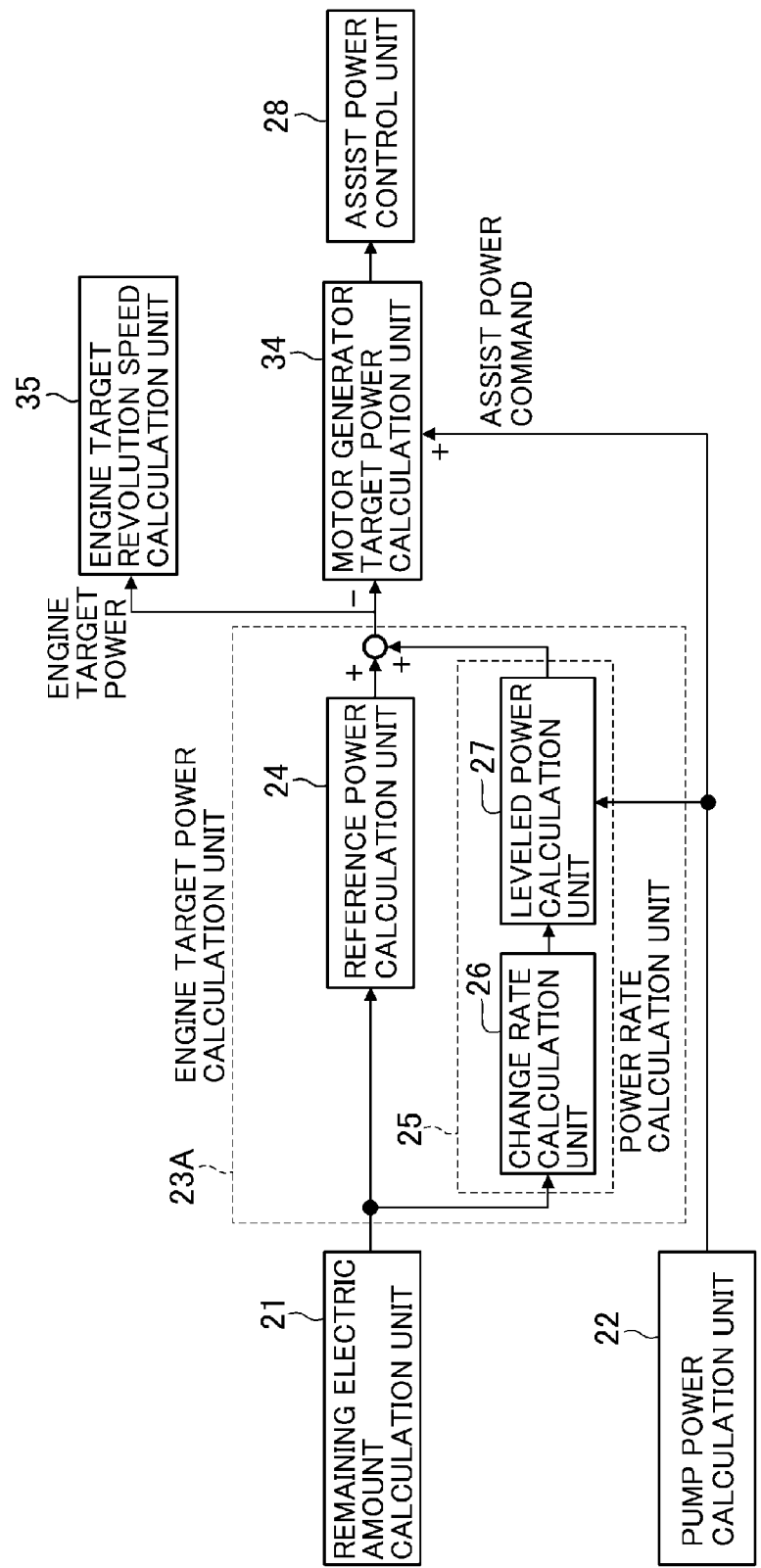
FIG. 8 is a schematic block diagram showing the overall configuration of a controller according to a second embodiment of the present invention.

FIG. 8 is a schematic block diagram showing the overall configuration of a controller according to a second embodiment of the present invention. The controller shown in FIG. 8 includes an engine target power calculation unit 23A which differs from the engine target power calculation unit 23 in the first embodiment. Differently from the engine target power calculation unit 23 in the first embodiment, the engine target power calculation unit 23A considers to what extent the rate of change of the engine target power should follow the rate of change of the pump demanded power. Specifically, the engine target power calculation unit 23A performs calculations for increasing the rate of change of the engine target power (bringing the rate of change close to the rate of change of the pump demanded power) with the decrease in the SOC of the electrical storage device 10.

The engine target power calculation unit 23A includes a reference power calculation unit (reference power calculation means) 24 for executing a process of calculating a reference value of the target power of the engine 1 based on the SOC and a power rate calculation unit 25 (power rate calculation means) for executing a process of calculating the range of fluctuation and the rate of change of the target power of the engine 1 based on the SOC. The power rate calculation unit 25 includes a change rate calculation unit (change rate calculation means) 26 which prescribes the rate of change (time constant T) of the engine target power according to the SOC and a leveled power calculation unit (leveled power calculation means) 27 which prescribes the amount of change in power from the reference value (calculated by the reference power calculation unit 24) according to the pump demanded power. The engine target power calculation unit 23A regards the sum of the calculations by the reference power calculation unit 24 and the power rate calculation unit 25 as the engine target power and outputs the obtained engine target power to the engine target revolution speed calculation unit 35 and the motor generator target power calculation unit 34. The engine target revolution speed calculation unit 35 calculates the target revolution speed command by using the engine target power in the same way as in the first embodiment. Meanwhile, the motor generator target power calculation unit 34 calculates the assist power command from the difference between the engine target power and the pump demanded power calculated by the pump power calculation unit 22. Next, concrete calculation processes executed by the reference power calculation unit 24, the change rate calculation unit 26 and the leveled power calculation unit 27 in this embodiment will be explained below referring to FIG. 9.

Figure 9:
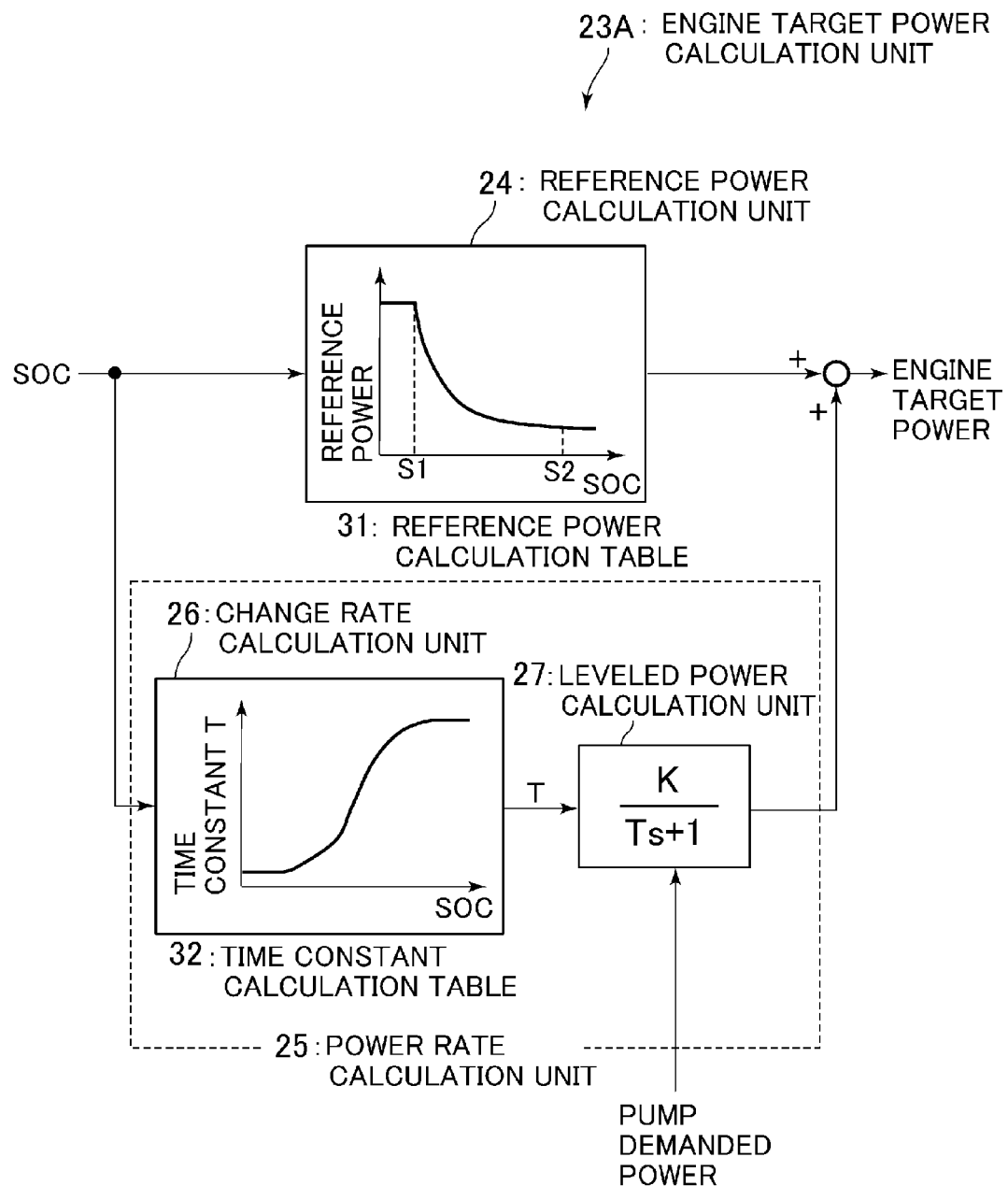
FIG. 9 is a schematic diagram showing an example of a calculation process executed by an engine target power calculation unit 23A.

FIG. 9 is a schematic diagram showing an example of the calculation process executed by the engine target power calculation unit 23A. The reference power calculation unit 24 uses a reference power calculation table 31 shown in FIG. 9 for determining the reference value of the engine target power based on the SOC calculated by the remaining electric amount calculation unit 21. The reference power calculation table 31 has a horizontal axis representing the SOC as the input to the reference power calculation unit 24 and a vertical axis representing the reference power as the output from the reference power calculation unit 24. While the reference power calculation table 31 in FIG. 9 differs from the table in FIG. 4 in the first embodiment in that the relationship between the SOC and the reference power is defined by a curved line, the two tables have a commonality in that the reference power is prescribed so as to increase with the decrease in the SOC. Also in the example of FIG. 9, the reference value (engine target power) is assumed to reach its maximum value when the SOC falls to or below S1 and to reach its minimum value when the SOC rises to or above S2. Next, the minimum value of the reference value will be explained below.

Figure 10:
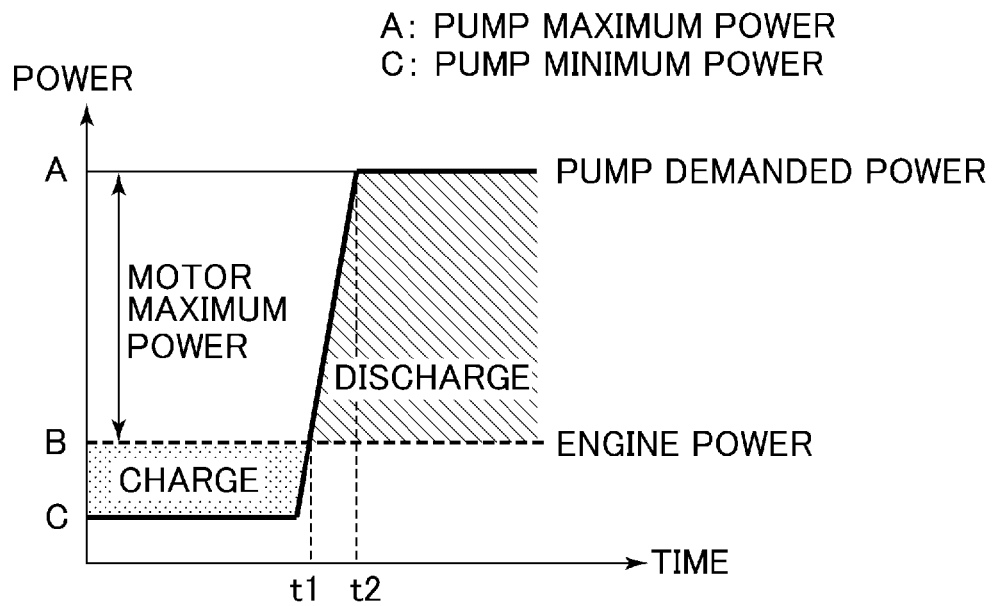
FIG. 10 is a graph for explaining the minimum value of a reference value of the engine target power.

FIG. 10 is a graph for explaining the minimum value of the reference value of the engine target power. The minimum value of the reference value (engine target power) in the reference power calculation table 31 is desired to be prescribed as "maximum power of the hydraulic pump 3–maximum power of the motor generator 2". By employing this value as the minimum value of the reference value, the pump demanded power can be fulfilled without the need of changing the engine power even when the pump demanded power increased sharply as shown in FIG. 10. Thus, no deterioration is caused to the combustion status of the engine 1 or to the operability of hydraulic devices. When the pump demanded power is low, preparation for a time when the assistance becomes necessary can be made by performing the charging by use of the motor generator 2. However, the charging cannot be performed when the electrical storage device 10 is full. In such cases, it is necessary to prevent the overcharge of the electrical storage device 10 by stopping the engine 1 or temporarily lowering the reference value of the engine target power.

It is also possible to determine the minimum value of the engine target power based on the "responsiveness of the motor generator 2". In this case, it is desirable to set the point B in FIG. 10 so that the power change rate "(A−B)/(t2−t1)" (which is determined by the time "t2−t1" it takes to reach the pump maximum power point A from the engine power point B) is within the maximum power change rate of the motor generator 2. In the actual use, it is the most desirable to compare engine target power defined by the maximum power with engine target power defined by the power change rate and select the higher one. Incidentally, the "power change rate" means the amount of change in the power per unit time. The power change rate indicates the output responsiveness of the engine 1, the motor generator 2, etc.

Figure 11:
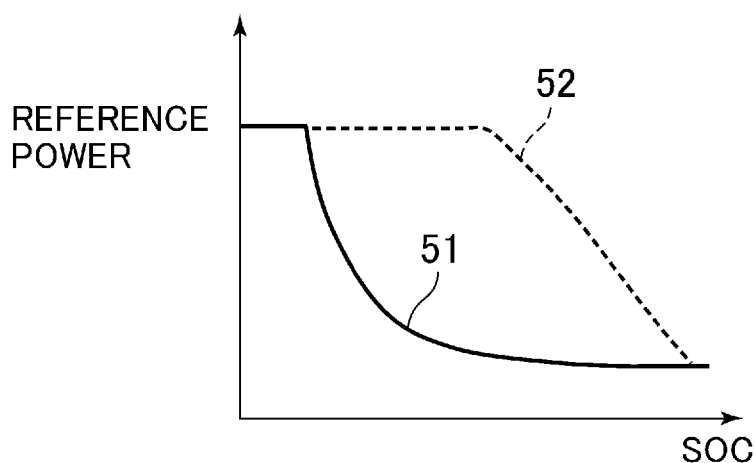
FIG. 11 is a schematic diagram showing another example of a reference power calculation table 31.

FIG. 11 is a schematic diagram showing another example of the reference power calculation table 31. When the SOC is increased by performing the power generation by use of the motor generator 2 after a drop in the SOC, the reference value of the target power of the engine 1 is lowered again. In this case, a repetition of charging and discharging (hunting) can occur due to the switching of the control target value. To deal with this problem, it is desirable to use a reference power calculation table 31 having hysteretic characteristics as shown in FIG. 11. In this power calculation table 31, the reference power is increased along the solid line 51 when the SOC decreases. When the SOC increases, the reference power is decreased along the dotted line 52. The hunting can be prevented by using such a reference power calculation table 31.

The power rate calculation unit 25 will be explained below by referring again to FIG. 9. The power rate calculation unit 25 employs a configuration using a first order lowpass filter. In the power rate calculation unit 25 in this embodiment, the time constant T of the lowpass filter is determined first according to the SOC calculated by the remaining electric amount calculation unit 21. A time constant calculation table 32 shown in FIG. 9 is used for the calculation of the time constant T. The time constant calculation table 32 has a horizontal axis representing the SOC as the input to the change rate calculation unit 26 and a vertical axis representing the time constant T as the output from the change rate calculation unit 26. In the time constant calculation table 32, the time constant T is set long/short when the remaining electric amount is high/low (i.e., when the SOC is high/low).

The leveled power calculation unit 27 is configured as a first order lowpass filter, in which the time constant T changes depending on the output of the change rate calculation unit 26. By applying this lowpass filter to the pump demanded power calculated by the pump power calculation unit 22, a leveled value of the pump demanded power is obtained as the output of the power rate calculation unit 25. The character "s" in FIG. 9 represents the Laplace operator and "K" represents the gain (ditto for subsequent figures).

With such a configuration of the power rate calculation unit 25, when the remaining electric amount is high (i.e., when the SOC is high), the time constant T takes on a high value and the output of the power rate calculation unit 25 rises extremely slowly compared to the rate of change of the pump demanded power. Thus, even when the pump demanded power rises sharply, the engine target power scarcely changes from the reference power calculated by the reference power calculation unit 24. Consequently, the engine 1 is allowed to maintain a stable combustion status.

In contrast, when the remaining electric amount is low (i.e., when the SOC is low), the time constant T takes on a low value and the output of the power rate calculation unit 25 rises relatively quickly compared to cases where the time constant T is long (the SOC is high). Therefore, when the SOC is low and sufficient motor assistance would be impossible, the pump demanded power is secured by setting the output change rate of the engine 1 at a high value. Consequently, excellent operability is maintained.

Incidentally, since the minimum value of the time constant T determined by the time constant calculation table (change rate calculation unit 26) (minimum time constant) specifies the maximum value of the power change rate of the engine, the lowpass filter has to be designed so that the frequency range passing through the lowpass filter at the minimum time constant T is within a range not deteriorating the fuel efficiency of the engine or the transient response characteristics of the exhaust gas. The gain K of the lowpass filter, which is used by the leveled power calculation unit 27, also serves as a parameter that determines the rate of change of the engine target power. Incidentally, while the gain K is simply set as a constant value in this embodiment, it is also possible to employ a configuration for changing the value of the gain K according to the SOC similarly to the time constant T.

While a first order lowpass filter is used for the leveled power calculation unit 27 in the example of FIG. 9, the method for implementing the controller is of course not restricted to this example. In the above example, "changing the time constant in the use of a first order lowpass filter" corresponds to "changing the number of data points in the use of a moving average", "changing the rate of change in the use of a rate limiter", and so forth. Further, it is of course possible to use a "high order lowpass filter". In this case, a parameter for changing the cutoff frequency is adjusted.

Incidentally, the power change rate of the motor generator 2 is higher than the power change rate of the engine 1, and the power actually outputted by the motor generator 2 instantaneously coincides with the "assist power command". Therefore, with the configuration described above, the power actually outputted by the engine 1 becomes equal to "pump power−assist power command". To sum up, while the power of the engine 1 is not directly controlled in this embodiment, the power of the engine 1 can be indirectly controlled to follow the target power calculated by the target power calculation unit 23.

Next, how the pump demanded power, the engine target power and the assist target power (assist power command) are calculated according to the SOC in the hydraulic excavator configured as above will be explained below along a time line.

Figure 12A:
FIG. 12A-12C are schematic diagrams showing changes in the SOC, the pump demanded power, the engine target power and the assist target power when the SOC is high.
Figure 12B:
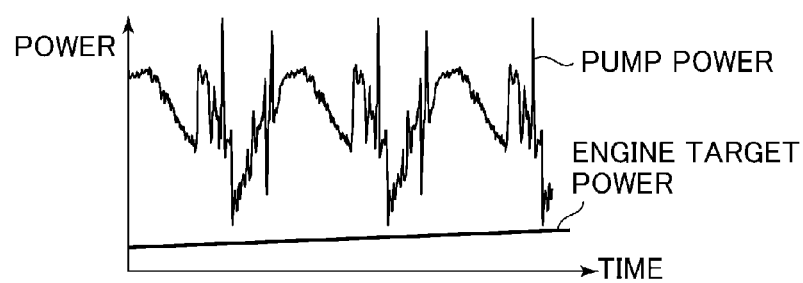
Figure 12C:
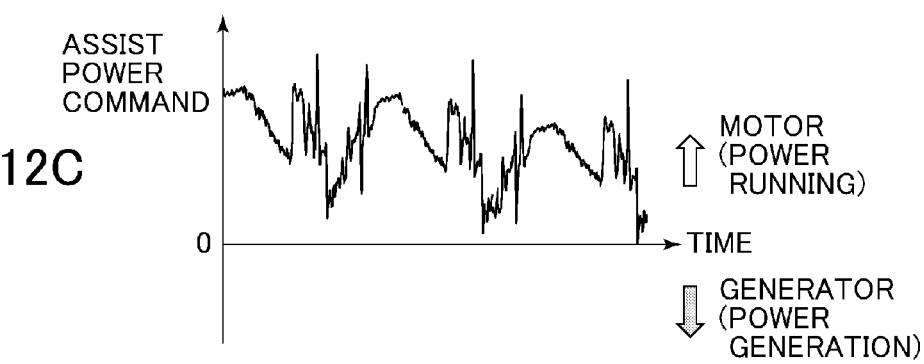

FIG. 12 is a schematic diagram showing changes in the SOC, the pump demanded power, the engine target power and the assist power command when the SOC is sufficiently high (e.g., at the start of a day's operation after nighttime charging of the electrical storage device 10). In the example of FIG. 12, the reference value of the engine target power starts from a minimum value when the SOC is that at time 0. At this point, the time constant T determined by use of the time constant calculation table 32 is at its maximum value. Therefore, the rate of change of the engine target power does not follow that of the pump power and the engine target power keeps on taking on values close to the reference value.

With the progress of the electric discharge from the electrical storage device 10, the SOC gradually decreases as shown in FIG. 12(*a*). Accordingly, the reference power calculated by the reference power calculation unit 24 increases gradually, whereas the time constant T still remains long. Thus, the engine target power exhibits behavior like increasing contrary to the decrease of the SOC as shown in FIG. 12(*b*). Since the engine target power is set relatively low as above, "pump power−engine target power" almost always takes on positive values. Therefore, the assist power command to the motor generator 2 (FIG. 12(*c*)) frequently works on the assisting side and fluctuates widely. By quickly supplying power from the motor generator 2 for the quickly changing pump demanded power as explained above, the actual power of the engine 1 is allowed to change smoothly.

Figure 13A:
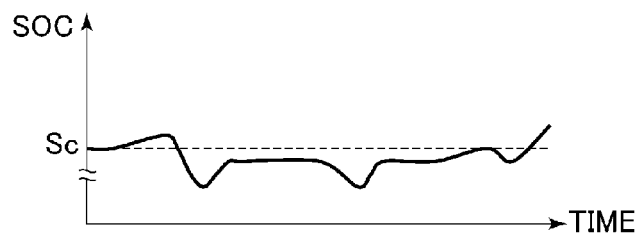
FIG. 13A-13C are schematic diagrams showing changes in the SOC, the pump demanded power, the engine target power and the assist target power when the SOC has decreased to a prescribed level.
Figure 13B:
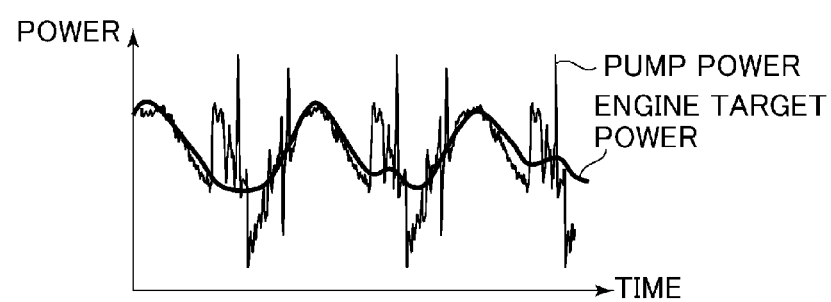

Next, the behavior of the above-described values when a certain period has passed since the state of FIG. 12 and the SOC has decreased to a prescribed level will be explained below referring to FIG. 13. FIG. 13 is a schematic diagram showing changes in the SOC, the pump demanded power, the engine target power and the assist target power when the SOC has decreased to the vicinity of a prescribed level Sc (higher than S1 and lower than S2) indicated by the broken line in FIG. 13(*a*).

In this case, in response to the decrease in the SOC, the reference power calculated by the reference power calculation unit 24 has become a bit higher compared to the previous case, and the time constant T determined by the change rate calculation unit 26 has become shorter compared to the previous case.

Figure 13C:
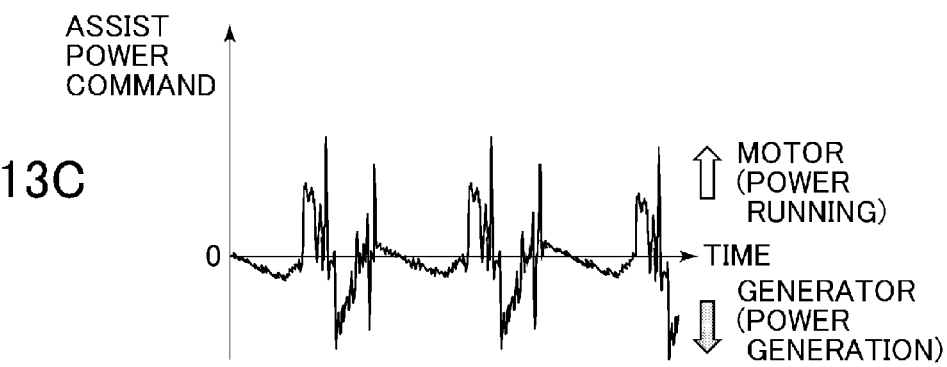

Also in this case, it is desirable, similarly to the first embodiment, to previously adjust the engine target power substantially at the median (e.g., moving average) of the pump demanded power or at a value slightly higher than the median. Thanks to the adjustment, the engine target power takes on the median of the pump demanded power, and thus the assist power command to the motor generator 2 (which is calculated as "pump demanded power−engine target power") repeats charging and discharging as shown in FIG. 13(c). This keeps the SOC at a constant level while also preventing sharp changes in the power of the engine 1. Consequently, the situations where the assistance for the engine 1 by the motor generator 2 is impossible can be avoided. On the other hand, setting the engine target power higher than the median of the pump demanded power has the effect of preventing the decrease in the SOC caused by the energy loss due to the charging and discharging.

Figure 14A:
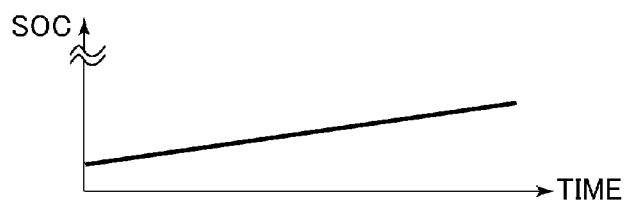
FIG. 14A-14C are schematic diagrams showing changes in the SOC, the pump demanded power, the engine target power and the assist target power when the SOC is low.
Figure 14B:
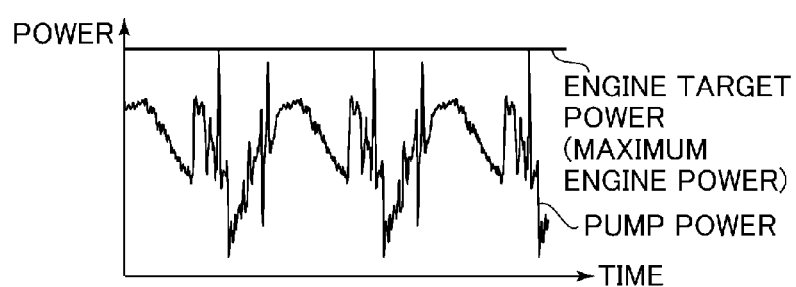
Figure 14C:
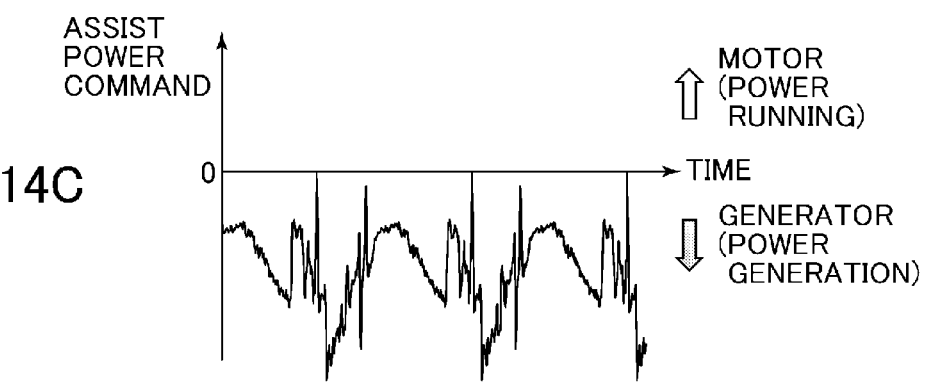

Finally, the behavior of the above-described values when the SOC has fallen below S1 will be explained referring to FIG. 14. FIG. 14 is a schematic diagram showing changes in the SOC, the pump demanded power, the engine target power and the assist target power when the SOC is lower than S1.

In this case, the reference power of the engine 1 calculated by the reference power calculation unit 24 takes on a value higher than the maximum value of the engine power. When the reference power calculation table 31 shown in FIG. 11 is used, the reference power is kept at this value until the SOC recovers to a certain value since the reference power is controlled along the dotted line 52.

Since the SOC in this case is low, the time constant T calculated by the change rate calculation unit 26 takes on small values. Accordingly, the rate of change of the power calculated by the leveled power calculation unit 27 approaches that of the pump demanded power. Incidentally, similarly to the first embodiment, the threshold value (S1) of the SOC for implementing the condition shown in FIG. 14 is desired to be designed based on the variation profile of the pump demanded power in the construction machine employing the present invention.

Figure 15:
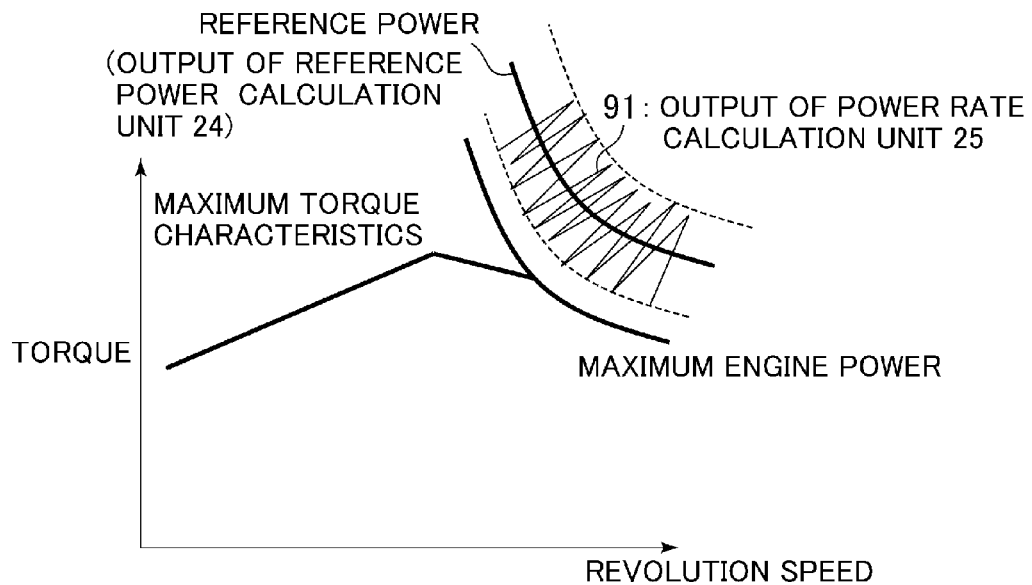
FIG. 15 is a schematic diagram for simply explaining a method for determining the engine target power when the SOC is low.

The change in the engine target power in the state shown in FIG. 14 will be explained below by using a torque-revolution speed characteristic diagram (T-N characteristic diagram) of the engine 1 (FIG. 15). FIG. 15 is a schematic diagram for simply explaining a method for determining the engine target power when the SOC is low.

First, as mentioned above, the reference power of the engine target power takes on values higher than the maximum power line of the engine 1 as shown in FIG. 15. The calculation performed by the lowpass filter corresponds to variation 91 from the reference power. The variation 91 shown in FIG. 15 is just an example for clarifying the explanation; the extent of the variation 91 is not restricted to the illustrated example. If the reference power (the output of the reference power calculation unit 24) is set sufficiently high as shown in FIG. 15, the engine target power (the sum of the output of the reference power calculation unit 24 and the output of the power rate calculation unit 25), which is generated in consideration of the variation 91 (the output of the power rate calculation unit 25), also constantly remains higher than the maximum power line of the engine 1. However, the target power of the engine 1 cannot be set higher than the maximum power of the engine 1 and thus the finally calculated engine target power (the output of the engine target power calculation unit 23A) is limited to the maximum power and keeps on taking on the value. As above, when the SOC is low as shown in FIG. 14, the assist power command to the motor generator 2 is defined by the value of "engine maximum power−pump demanded power" and is constantly given as a "power generation request". In cases where an engine whose maximum power can be lower than the pump demanded power is mounted on the hybrid construction machine for a purpose like the downsizing of the engine, proper control such as limiting the pump demanded power is necessary.

With the setting of the reference power shown in FIG. 15, the engine 1 operates at its rated power point. Therefore, the combustion status of the engine 1 is stabilized and the content of environmental load substances in the exhaust gas is reduced. Further, excellent operability is maintained since no power deficiency occurs with respect to the pump demanded power. Furthermore, improvement in the fuel efficiency can be expected since the power generation is performed exclusively at the high output power point where the efficiency of the engine 1 is high.

According to this embodiment configured as above, when the remaining electric amount of the electrical storage device 10 is high, the change in the target power of the engine becomes sufficiently gradual relative to the rate of change of the pump demanded power. Further, by using the difference between the engine target power and the pump demanded power as the assist power command (assist target power), quick power assistance is implemented by the highly-responsive motor generator 2, fulfilling the pump demanded power by the engine 1 and the motor generator 2. In this case, the power of the engine 1 (of lower responsiveness compared to the motor generator 2) changes in a gradual manner. Thus, the transient fuel injection into the engine 1 is reduced and the content of the environmental load substances in the exhaust gas is reduced. Furthermore, the energy generated by the engine 1 can be used without waste since the surplus of the engine power is used for power generation when the pump demanded power has dropped sharply.

Meanwhile, thanks to the configuration for increasing the share of the burden on the engine power with the increase in the rate of change of the engine target power when the remaining electric amount of the electrical storage device 10 is low, the demanded power of the hydraulic pump 3 can be secured by the engine 1 alone even when sufficient assistance by the motor generator 2 is impossible due to the low remaining electric amount. This makes it possible to keep excellent operability irrespective of the remaining electric amount of the electrical storage device 10, Moreover, according to this embodiment, the rate of change of the engine power is set relatively low in the region in which the engine target power is relatively low (low output power region), and relatively high in the region in which the engine target power is relatively high (high output power region). With this control, operations involving the risk of increasing the environmental load by the exhaust gas can be reduced in the low output power region and wasteful fuel consumption can be suppressed in the high output power region. In short, this embodiment achieves effects for both the improvement of fuel efficiency and the reduction of exhaust gas. Incidentally, while the above-described operations and effects are achieved in this embodiment by use of the configuration for changing the rate of change of the engine power based on the SOC and the pump demanded power, it is also possible to achieve equivalent operations and effects by use of a configuration for setting a limit value of the engine power change rate (rate of change of the engine power) according to the magnitude of the engine target power and changing the set value (limit value) according to the magnitude of the engine target power (i.e., increasing the limit value of the engine power change rate with the increase in the engine target power).

While the above embodiments have been described by taking an example of revolution speed control of the engine 1 by the engine target revolution speed control unit 36 (see FIG. 3), no description has been given particularly in regard to a concrete method of the calculation of the engine target revolution speed by the engine target revolution speed calculation unit 35 (see FIG. 3). Preferably, the engine target revolution speed is calculated based on engine characteristic data indicating the relationship among the amount of exhaust gas components (e.g., nitrogen oxides), the fuel efficiency, the engine revolution speed and the torque. Therefore, a preferable example of the calculation of the target revolution speed by the engine target revolution speed calculation unit 35 will be explained below.

Figure 16:
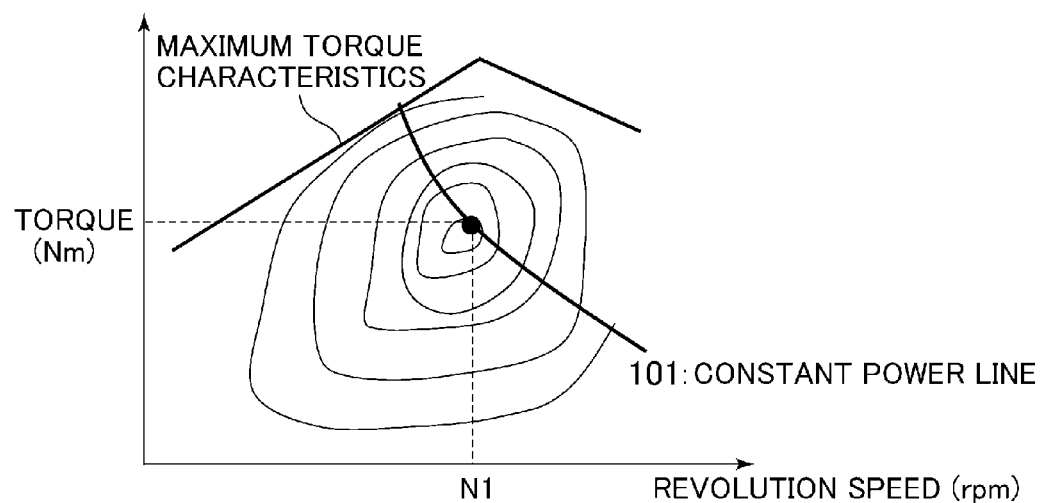
FIG. 16 is a schematic diagram showing a constant fuel efficiency table which is used by an engine target revolution speed calculation unit 35 according to a third embodiment of the present invention.

FIG. 16 is a schematic diagram showing a constant fuel efficiency table which is used by the engine target revolution speed calculation unit 35 according to a third embodiment of the present invention. The constant fuel efficiency table shown in FIG. 16 represents engine characteristic data (indicating the fuel efficiency of the engine at prescribed revolution speed and torque) in a table format. The fuel efficiency characteristics of the engine 1 are indicated by plotting combinations of revolution speed and torque achieving the same fuel efficiency as a contour line on a two-dimensional plane with a horizontal axis representing the engine revolution speed and a vertical axis representing the engine torque.

The aforementioned engine target revolution speed calculation unit 35 operates based on the engine target power inputted from the engine target power calculation unit 23 described above. The engine target revolution speed calculation unit 35 extracts (selects) a combination of torque and revolution speed capable of achieving intended fuel efficiency (or a combination closest to the intended fuel efficiency) from a plurality of combinations of torque and revolution speed at which the engine target power can be outputted, and outputs the revolution speed in the extracted combination as the target revolution speed. Incidentally, the engine power is the product of the torque and the revolution speed, and the combinations of torque and revolution speed at which prescribed engine target power can be achieved can be drawn as a curve (constant power line 101) on the constant fuel efficiency table. Therefore, it is also possible, as shown in FIG. 16, to draw the constant power line 101 based on the input value from the engine target power calculation unit 23, select an operation point of the highest fuel efficiency from the points on the constant power line 101, and output the revolution speed (N1) of the selected operation point as the target revolution speed. The output of the engine target revolution speed calculation unit 35 is used as the target revolution speed of the engine 1.

The target revolution speed can also be determined by use of a "constant exhaust gas table" representing engine characteristic data (indicating the amount of exhaust gas components (e.g., nitrogen oxides) at prescribed revolution speed and torque) in a table format similarly to the constant fuel efficiency table shown in FIG. 16. For example, there exists a constant exhaust gas table having a horizontal axis representing the revolution speed and a vertical axis representing the torque and indicating exhaust gas component characteristics of the engine 1 by plotting a plurality of combinations of revolution speed and torque achieving the same steady-state characteristic of various exhaust gas components such as nitrogen oxides, particulate matter and carbon dioxide (e.g., the same amount of the various exhaust gas components) as a contour line. By using the constant exhaust gas table similarly to the aforementioned constant fuel efficiency table, the amount of the environmental load substances in the exhaust gas in the steady state can be optimized, by which the exhaust gas purification effect by the load leveling can be enhanced further. A combined use of the "constant fuel efficiency table" and the "constant exhaust gas table" makes it possible to drive the engine 1 at an operation point achieving low fuel consumption (high fuel efficiency) and low gas emission (low emission). Incidentally, the target revolution speed may also be determined based on other types of engine characteristic data (other than the engine characteristic data regarding the fuel efficiency or the exhaust gas).

With the above configuration of the engine target revolution speed calculation unit 35, the engine 1 can be operated at a revolution speed desirable from the viewpoint of the fuel efficiency or the exhaust gas, without the need of the operator's work for successively setting the engine revolution speed. This not only achieves the energy saving and the reduction of the environmental load substances in the exhaust gas but also leads to a reduction in the workload on the operator.

Incidentally, the configuration of the engine target power calculation unit 23A shown in FIG. 9 is effective in cases where an electrical storage device having high energy density and capable of continuously supplying high output (e.g., lithium-ion battery) is used as the electrical storage device 10. However, if the reference power is determined according to the SOC as shown in FIG. 9 also when an electrical storage device only capable of momentarily supplying energy (e.g., capacitor) is used, the reference power can fluctuate sharply and the engine might stall when the engine power drops. Therefore, a configuration that is effective in cases of using an electrical storage device like a capacitor as the electrical storage device 10 will be explained below referring to FIG. 17.

Figure 17:
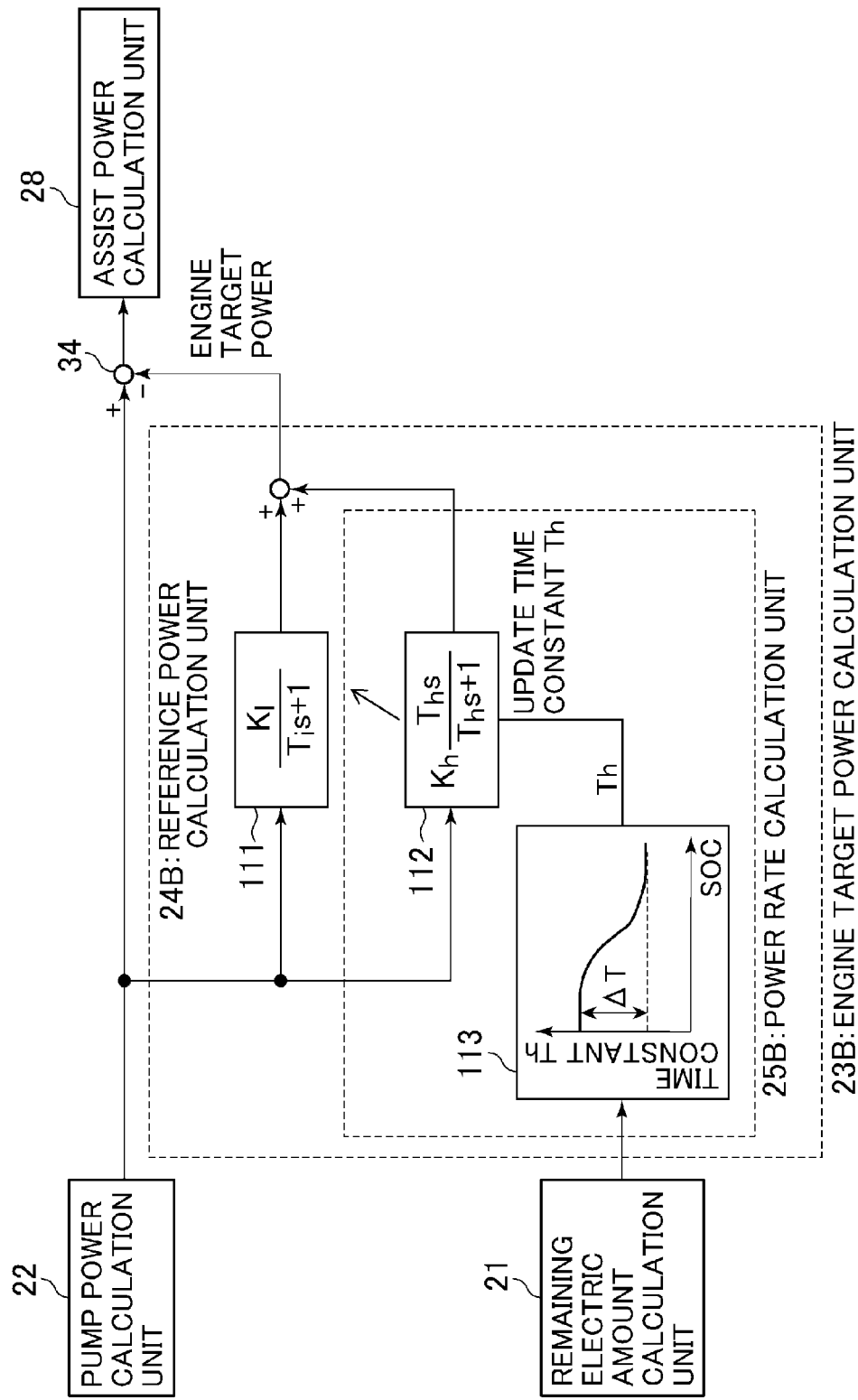
FIG. 17 is a schematic diagram showing an example of a calculation process executed by an engine target power calculation unit 23B.

FIG. 17 is a schematic diagram showing an example of a calculation process executed by an engine target power calculation unit 23B. The engine target power calculation unit 23B shown in FIG. 17 includes a reference power calculation unit 24B and a power rate calculation unit 25B.

The reference power calculation unit 24B (implemented by a lowpass filter 111) is a part for executing a process of generating the reference power by applying the lowpass filter 111 to the pump demanded power outputted from the pump power calculation unit 22. In FIG. 17, "Kl" represents the gain and the time constant Tl is a value that is independent of the SOC. The generation of the reference power by use of such a lowpass filter 111 leads to a tendency to set the engine target power at the median of the pump demanded power (e.g., the state shown in FIG. 13). Consequently, the frequency of high-output power assistance continuing for a long time decreases compared to the case of FIG. 9.

The power rate calculation unit 25B is a part for executing a process of determining the rate of change and the range of fluctuation of the engine target power by applying a highpass filter 112 to the pump demanded power outputted from the pump power calculation unit 22. The character "Kh" in FIG. 17 represents the gain. The power rate calculation unit 25B is equipped with a time constant calculation table 113 for determining a time constant Th (to be used by the highpass filter 112) according to the SOC outputted from the remaining electric amount calculation unit 21. In the time constant calculation table 113, the time constant Th is set shorter/longer with the increase/decrease in the remaining electric amount (i.e., with the increase/decrease in the SOC) similarly to the time constant calculation table 32 shown in FIG. 9.

With the highpass filter 112 employing the time constant Th which is set as above, when the SOC is high, the time constant of the highpass filter 112 becomes short, and thus high-frequency components passing through the highpass filter 112 decrease. Accordingly, when the remaining electric amount is high, the range of fluctuation of the engine target power becomes narrower and power fluctuation covered by the motor generator 2 increases. In contrast, when the remaining electric amount becomes low, the time constant of the highpass filter 112 becomes longer, and thus high-frequency components passing through the highpass filter 112 increase. Incidentally, a great change in the time constant of the highpass filter 112 can cause a sharp increase in the engine target power. To avoid this problem, it is desirable in the time constant calculation table 113 to set the amount of change in the time constant along with the change in the SOC (ΔT in FIG. 17) at a relatively small value.

By the engine target power calculation unit 23B configured as above, the sum of the output values of the reference power calculation unit 24B and the power rate calculation unit 25B is outputted as the final engine target power. In this case, the reference power is calculated by the reference power calculation unit 24B irrespective of the SOC of the electrical storage device 10, whereas the engine target power finally outputted from the engine target power calculation unit 23B is set higher with the decrease in the SOC due to the function of the power rate calculation unit 25B. With this configuration, the behavior repeats variation basically equivalent to that in FIG. 13 even with the change in the SOC of the electrical storage device 10. Therefore, by configuring the engine target power calculation unit 23B as described above, the occurrence of the engine stall when the engine power drops can be avoided even in cases where a capacitor is used as the electrical storage device 10.

Incidentally, while the control in the above embodiments is performed to increase the engine target power with the decrease in the SOC of the electrical storage device 10, the control may also be performed by setting a limit value of the engine target power and increasing the limit value with the decrease in the SOC. In other words, the "limit value of the engine target power", instead of the engine target power, may be controlled according to the SOC. While the explanation of the above embodiments has been given by taking a hydraulic excavator as an example, it goes without saying that the present invention is applicable also to other types of hybrid construction machines in which the hydraulic pump for supplying the hydraulic fluid to the hydraulic actuators is driven by the engine and the motor generator.

Additionally, the present inventors have confirmed that the application of the present invention typified by the above embodiments to hybrid hydraulic excavators successfully reduces particulate matter in the exhaust gas by approximately 30% and nitrogen oxides by approximately 20% in standard operations of the hydraulic excavators.

DESCRIPTION OF REFERENCE CHARACTERS 1 engine
2 motor generator
3 hydraulic pump
5 hydraulic actuator
9 inverter
10 electrical storage device
16 control lever
21 remaining electric amount calculation unit
22 pump power calculation unit
23, 23A, 23B engine target power calculation unit
24, 24B reference power calculation unit
25, 25B power rate calculation unit
26 change rate calculation unit
27 leveled power calculation unit
28 assist power control unit
28 reference power calculation table
31 time constant calculation table
32 motor generator target power calculation unit
34 engine target revolution speed calculation unit
36 engine target revolution speed control unit
111 lowpass filter
112 highpass filter
113 time constant calculation table

The invention claimed is:

1. A hybrid construction machine comprising:
an engine;
a motor generator which exchanges torque with the engine;
a hydraulic pump which is driven by at least one of the engine and the motor generator;
a hydraulic actuator which is driven by hydraulic fluid delivered from the hydraulic pump;
an electrical storage device which supplies electric power to the motor generator; and
control means which sets target power of the engine based on the remaining electric amount of the electrical storage device and sets target power of the motor generator based on the target power of the engine and demanded power of the pump,
wherein the target power of the engine is set to monotonically increase with the decrease in the remaining electric amount of the electrical storage device.

2. The hybrid construction machine according to claim 1, wherein the control means sets the rate of change of the target power of the engine higher with the decrease in the remaining electric amount.

3. The hybrid construction machine according to claim 1, wherein the control means sets a limit value of the rate of change of the power of the engine higher with the increase in the target power of the engine.

4. The hybrid construction machine according to claim 1, wherein the control means sets the target power of the engine at the maximum power of the engine when the remaining electric amount falls to or below a first set value.

5. The hybrid construction machine according to claim 4, wherein the control means sets the target power of the engine at a value lower than the minimum power of the hydraulic pump when the remaining electric amount rises to or above a second set value which is higher than the first set value.

6. The hybrid construction machine according to claim 1, wherein the control means sets target revolution speed of the engine based on the target power of the engine and engine characteristic data indicating relationship among revolution speed and torque of the engine and at least one selected from fuel efficiency of the engine and the amount of exhaust gas.

* * * * *